(12) United States Patent
Von Seidel

(10) Patent No.: US 7,270,291 B2
(45) Date of Patent: Sep. 18, 2007

(54) METHOD AND SPOOL FOR SHORTENING AND OPTIONALLY TENSIONING ELONGATE TENSION MEMBERS

(76) Inventor: Michael Von Seidel, 10 Leccino Terrace, Bakkershoogte, Somerset West 7130 Western Cape Province (ZA)

( * ) Notice: Subject to any disclaimer, the term of this patent is extended or adjusted under 35 U.S.C. 154(b) by 372 days.

(21) Appl. No.: 10/511,946

(22) PCT Filed: Sep. 16, 2002

(86) PCT No.: PCT/IB02/03793

§ 371 (c)(1),
(2), (4) Date: Oct. 20, 2004

(87) PCT Pub. No.: WO03/089807

PCT Pub. Date: Oct. 30, 2003

(65) Prior Publication Data

US 2005/0173583 A1    Aug. 11, 2005

(30) Foreign Application Priority Data

Apr. 22, 2002  (ZA) ................................ 2002/3149
Jun. 3, 2002   (ZA) ................................ 2002/4411

(51) Int. Cl.
*B65H 75/38*   (2006.01)

(52) U.S. Cl. .............................. 242/388.2; 242/388.4; 242/588.2; 24/269; 24/909

(58) Field of Classification Search .................. 24/269, 24/909; 242/388.2, 388.4; 248/492, 493, 248/495; *A01G 17/04; F16G 11/12; B65H 75/38*
See application file for complete search history.

(56) References Cited

U.S. PATENT DOCUMENTS 1,792,468 A    2/1931    Sheckels et al.

(Continued)

FOREIGN PATENT DOCUMENTS

CH    216 886    9/1941

(Continued)

*Primary Examiner*—Gene O. Crawford
*Assistant Examiner*—Stefan Kruer
(74) *Attorney, Agent, or Firm*—Meyertons, Hood, Kivlin, Kowert & Goetzel, P.C.; Eric B. Meyertons

(57) ABSTRACT

A method and a spool (1, 10, 21, 22, 35) for shortening the length of a cord (14) and optionally tensioning it at the same time is provided. The spool has a shank having two ends each of which has a transverse retainer formation (4, 13, 20, 40, 51 and 5, 11, 25, 33, 36, 42, 49, 50, 58) adapted operatively to prevent unravelling off the shank of cord wound around the elongate shank, at least whilst it is held under tension and with the axis of the shank extending in the same general direction as that in which the cord extends. A keeper formation (4, 13, 20, 40, 51) that is preferably one in the same with the ring and a formation at one end of the shank cooperates with a cord to maintain said end in association with the cord whilst the shank is rotated to wind cord onto the shank by rotation thereof. A torque transmitting formation (5, 11, 25, 33, 36, 42, 49, 50, 58) that is preferably one and the same with the retainer formation associated with the other end of the shank enables rotation of the shank substantially about its own axis to be effected manually in the case that an integral handle is provided or by engagement thereof with a tool (44, 52). Typically, the length of the shank is from about 10 to about 50 times the diameter of the shank.

12 Claims, 5 Drawing Sheets

U.S. PATENT DOCUMENTS

| | | |
|---|---|---|
| 2,475,525 A | 7/1949 | Shields |
| 2,577,299 A | 12/1951 | Stephen et al. |
| 3,438,098 A | 4/1969 | Grabner |
| 3,568,261 A * | 3/1971 | Korb .......................... 24/71.1 |
| 3,879,805 A * | 4/1975 | Gretter ....................... 24/71.1 |
| 4,041,992 A | 8/1977 | Lynn |
| 5,012,559 A | 5/1991 | Flannery |
| 5,695,147 A | 12/1997 | Zimmerman |

FOREIGN PATENT DOCUMENTS

| | | |
|---|---|---|
| DE | 852 228 | 10/1952 |
| DE | 20 26 895 | 12/1971 |

* cited by examiner

METHOD AND SPOOL FOR SHORTENING AND OPTIONALLY TENSIONING ELONGATE TENSION MEMBERS

FIELD OF THE INVENTION

This invention relates to a method and spool for shortening the effective length of elongate flexible tension members whilst optionally tensioning them and, more particularly, but not exclusively, tension members that may be in the form of multistrand wires, or cords used for suspending pictures and other decorative items from a suspension point, typically a hook or nail fixed to a wall; as well as numerous other elongate flexible members held in tension such as, without restriction, guy ropes, clothes lines, communications cables such as aerial telephone wires and powerlines and strands of fence wires.

In one particular application the invention relates to a spool that can be used for shortening wires or cords suspending pictures with a view to adjusting the height of the picture relative to a hook or nail fixed to a wall against which it is suspended. In other applications the main objective is to apply tension to the elongate flexible tension member all to carry out a lifting operation of an object suspended by the flexible tension member. Thus, whilst the shortening of wires and cords used for suspending pictures will be described in greater detail herein the principles and scope of the invention extend to many other applications with only the size, strength and configuration of the spool being varied appropriately according to the purpose to which it is to be put.

It is to be understood that for simplicity of description the term cord will be used throughout this specification to include stranded or other wires, ropes, clotheslines etc as well as elongate tension members in general as the context will indicate. The scope of this invention is therefore not to be interpreted as being limited in any way by use of the expression "cord" in the definitive statements and claims hereof.

BACKGROUND TO THE INVENTION

Firstly, concerning the adjustment of the height of pictures suspended against a wall, it is generally desirable that at least particular pictures be suspended at a particular height that is most appropriate to the picture; its location or position, particularly relative to other pictures in order to form a desirable array of pictures; and the aesthetic requirements of persons concerned.

It has long been a problem to attach a cord of exactly the correct length to attachment points on a picture frame to result in the picture hanging at a particular required height. To tie, untie, and re-tie one or other end of such a cord is tedious and may have to be repeated a number of times.

As a result, numerous different proposals have been put forward to provide means for adjusting the effective length of such picture cord without tying and retying it. The various means of which applicant is aware can be classified broadly into distinct types.

One type of which U.S. Pat. Nos. 3,330,525 and 3,945, 599 are typical seeks to provide a series of different formations from which a picture can be suspended, the use of each different formation resulting in the picture hanging at a different height. The use of this type of device does not affect the length of the picture cord itself.

A second type of which U.S. Pat. Nos. 696,510, 769,695; and 862,011 are examples seeks to wind at least one end portion of the picture cord onto a reel that is arrested in the required position by means of a ratchet of some type or another. The axis of the reel is at generally right angles to the picture cord, in the normal way.

A third type seeks to create a deviation to the natural straight condition of a portion of the length of the cord so as to shorten the effective length thereof. U.S. Pat. Nos. 4,566, 665 and 3,251,569 and international patent application WO 9616580 achieve this using a screw thread and nut in combination with a pair of spaced guides so that the cord follows a generally U-shaped path. The depth of the U varies according to the position of the nut along the length of the screw thread to vary the effective length of the cord.

U.S. Pat. No. 5,695,147 is also of this general type and has a guide rotatable in unison with a ratchet for creating a variable degree of zigzag in the length of the picture cord to shorten it to different extents.

Yet another different type is set forth in European patent application number EP 1088502 in which at least one end region of the cord is engaged by a gripping dog of a fitting associated with the picture frame. The dog can be engaged with the cord at any position along its length to vary the effective length of the cord.

All of the above involve the use of relatively expensive and complicated gadgets. Also, most of them require removal of the picture from its suspended position and the attachment of the relevant device to the picture, usually to it's frame. This is relatively costly in time and effort apart from the cost of the device itself. It is often physically inconvenient or even difficult to remove a picture from a position in which hangs in order to apply such a device; damage to the picture can occur consequent on the necessary manhandling thereof; and the picture must be re-hung on the wall.

The prior art devices indicated above also, as a general rule, are not suitable for adjusting the position of the picture cord with the weight of the picture exerted on the cord. Also, at least many of them do not lend themselves to making rather small adjustments to the length of the cord. This is important the geometry of the usual arrangement path and dictates that a small adjustment in length of the cord gives rise to an adjustment in height of the picture that exceeds what is required.

The only other expedient of which applicant is aware is that set out in U.S. Pat. No. 4,364,538 that proposes a system of adjustable loops in a single or double picture cord. This expedient, applicant believes, is also fairly costly; is wasteful of cord; is difficult for an untrained person to install on a picture; and is also difficult to adjust, particularly with the full or much of the weight of the picture being supported by the cord.

As regards the tensioning of other elongate tension members such as clotheslines, ropes and the like many of the prior art expedients of which applicant is aware employ a spool of some sort around which the tension member is wound in a plane that is at generally right angles to the axis about which the spool is rotated. Typical of this type of tensioner are those described in French patent 2,564,024; German patent DE 19700186; and U.S. Pat. Nos. 559,133; 912,960; 1,191,598; 1,261,505; 1,476,026; 1,663,182; 1,670,257; 1,951,898; 1,972,321; 2,311,792 5,012,559; and 5,170,536.

U.S. Pat. No. 2,577,299 is a particular example of the latter type of spool and discloses a spool having a shank with a laterally offset anchorage stud formation at one end, a radially extending arm portion at the opposite end, and a hooklike portion at the free end of the arm. With the axis of the spool at generally right angles to the length of a wire to be tensioned a special tool is engaged with the end of the spool opposite the arm and the anchorage stud formation is engaged with the wire to cause it to start winding from both directions onto the shank portion. Once the wire has been tensioned, the hooklike portion is hooked over the wire to prevent it from rotating with consequent unwinding of the wire. The difficulty with this arrangement is that each half turn results in two half revolutions of wire being wound generally circumferentially onto the shank thereby providing inadequate fineness of adjustment of the tension. Also, the geometry of the shank being at right angles to the wire requires a number of revolutions of wire to be wound onto the shank in order that one end or the other does not disengage either the anchorage stud formation or the hook formation.

Other tensioners employ spaced formations adapted to take up a predetermined amount of cord length that may be selected from a plurality of different amounts and some of such tensioners are described in U.S. Pat. Nos. 5,655,267; 5,519,921; 5,383,256; 3,815,180; 3,711,901; 1,855,049; 550,970; and 432,429.

OBJECT OF THE INVENTION

It is, accordingly, an object of this invention to provide a method and spool for shortening the effective length of a cord whilst optionally tensioning same, whereby at least some of the disadvantages associated with prior art devices referred to above may be obviated, at least some extent.

SUMMARY OF THE INVENTION

In accordance with one aspect of the invention there is provided a spool for shortening the length of a cord and optionally tensioning it at the same time, the spool comprising a reel formation around which cord can be wound to shorten its effective length, formations for operatively preventing cord wound onto the reel from unwinding therefrom and means whereby the reel can be rotated either directly by hand or indirectly utilizing a tool, the spool being characterized in that the reel is in the form of an elongate generally straight shank around which cord is to be wound, the shank having two ends each of which has a transverse retainer formation adapted operatively to prevent unravelling off the shank of cord wound around the elongate shank, at least whilst it is held under tension, when the axis of the shank extends in the same general direction as that in which the cord extends; a keeper formation is located at one end of the shank; and the torque transmitting formation is located at the other end of the shank.

Further features of the invention provide for the transverse retainer formation at said one end of the shank to form also the keeper formation; for the retainer formation at the other end of the shank to form also the torque transmitting formation; for the length of the shank to be from about 10 to about 50 times the diameter thereof, preferably from 15 to 40 times the diameter; and for additional holding means to be provided for releasably engaging a cooperant cord to prevent unravelling thereof off the shank under conditions in which tension is removed from the cord.

In one preferred form of the invention the spool is formed from a suitable gauge of wire or rod that is bent to form a generally straight shank in the middle; a combination retainer formation and keeper formation at one end; and a combination retainer formation and torque transmitting formation at the other end. In that case the wire or rod can also be bent and optionally stamped to form any additional holding means for releasable engagement with a cooperating cord. Alternatively any additional holding means could be formed as part of a separate element for attachment to a handle of the spool. Of course, no additional holding means is required, and in the simplest forms of the invention such an expedient is omitted in order to save cost. As a general rule, such additional holding means is only required to prevent unravelling of any cord wound onto it when tension is substantially entirely removed from the cord as tension in the cord substantially locks the spool against unravelling of cord therefrom.

In instances in which expedience dictates that the torque transmitting formation preferably be a manually operable handle, and in this regard a spool for shortening picture cords to thereby adjust the height of an associated picture is of particular note, such formation is simply formed integral with the spool generally as a continuation of a length of bent wire or rod. Typically the handle could be wing shaped to project outwardly on diametrically opposite sides of the shank and the handle serves also as the retainer formation. The combined keeper and retainer formation at the opposite end can be defined by a portion of wire bent to form a hook or eye orientated roughly in a plane at generally right angles to the axis of the shank.

However, in instances in which the cord is a guy rope, clothesline or other tension member requiring significant torque to be applied to the spool, or where the cost of the spool is significant and would be uneconomical if the torque transmitting means were made integral, the torque transmitting formation is adapted for cooperation with a separate manually operable tool, typically in the form of a crank, for applying a rotational force to the spool by cooperation with the torque transmitting formation. In such a case the tool will preferably have engagement means configured to hold the spool and a cooperant part of the manually operable tool in substantial axial alignment during cooperative use of the tool on the spool for the purpose of rotating it.

In the latter instance the spool preferably has a generally axially extending axle for cooperation with a bore or socket in a cooperant part of said manually operable tool in order to align said part and the spool approximately axially during cooperant use thereof.

In an alternative form of the invention the keeper means is a slot extending axially inwards from the end of the shank remote from the handle.

In accordance with a second aspect of the invention there is provided a method of shortening a cord comprising the steps of associating the keeper means of a spool as defined above with the cord; rotating the shank generally about its own axis by means of the torque transmitting formation with the shank extending transverse to the cord so as to wind cord around the shank to a required extent; and releasing the torque transmitting formation such that the shank extends in the same general direction as the cord and the retainer means at each end serves to prevent unravelling of the cord from the shank.

Further features of this aspect of the invention provide for the spool to be manipulated such that the shank extends at an incline to the cord, at least during initial rotation of the shank and to initiate winding of the tension member around the shank; for the cord in the case that a plurality of revolutions of the shank are required to shorten the length thereof adequately to be predominantly wound on the shank near the end thereof having the keeper formation, this being effected by manipulating the angle at which the shank extends transverse to the general length of the cord, followed by a decrease in the angle at which the shank extends relative to the cord so that a final revolution or part revolution of the cord spirals along a substantial portion of the length of the shank; and, in the case that additional holding means are provided, to engage such holding means with the cord to releasably attach same to the spool.

The invention also provides a picture having a cord for suspending it from a suspension point and a spool as defined above associated with the cord.

In order that the above and other features, of the invention may be more fully understood various different embodiments thereof will now be described with reference the accompanying drawings.

DETAILED DESCRIPTION WITH REFERENCE TO THE DRAWINGS

Figure 1:
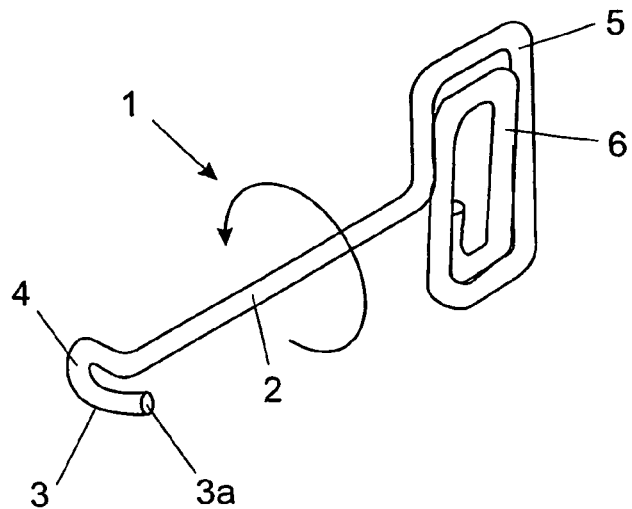
FIG. 1 is an isometric view of one embodiment of spool according to the invention there has additional holding means.
Figure 2:
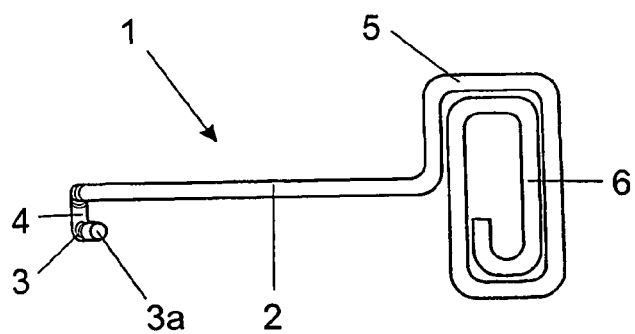
FIG. 2 is an elevation thereof.

In the embodiment of the invention illustrated in FIGS. 1 to 4 a spool, generally indicated by numeral (1), is made for the particular purpose of shortening picture cords and is formed from bent wire. The diameter of the wire is chosen according to requirements and it is envisaged that spools according to the invention may be made in different sizes for application to different size ranges of pictures and, more particularly, different thicknesses of cords. In this particular embodiment of the invention the spool is aimed at a rather middle of the range of thicknesses of cord and for this purpose a steel wire of about 2.5 to 3 mm (0.1 to 0.125 inch) in diameter has been found to operate satisfactorily as the shank.

The spool has a straight shank (2) the length of which can be chosen according to requirements and which is not be too short so as to make it difficult to use. A length of the shank of about 30 to 55 mm (12 to 22 inches) has been found to be effective and, a current model has a length of 50 mm (2 inches) with a diameter of 2.5 mm (0.1 inch). These dimensions translate to a range of length of shank of from 10 to 22 times the diameter of the wire. It will be understood that a longer shank will enable a more accurate shortening of the wire or cord to be possible although it will be correspondingly more expensive. Doubtless, experience will assist in enabling a substantially ideal length to be determined bearing in mind both cost and efficacy.

The wire at one end of the shank is bent generally radially outwards and thence into a generally radially inwardly projecting U-shaped or hook formation as indicated by numeral (3). The web (4) of the U-shape is -thus offset from the axis of the shank. The U-shaped formation forms a combination of both the, transverse retainer formation of one end of the shank and the keeper formation in this embodiment of the invention. It has been found that operation of the spool is facilitated if the free end (3a) of the U-shape is positioned radially offset from the shank and opposite the shank a short distance towards the opposite end thereof as shown clearly in FIG. 2.

The wire at the opposite end of the shank is bent radially outwards and thence into a diametrically extending rectangular handle (5) whereby the shank can be manually rotated about its own axis. The diametrical dimension of the handle can be, for example, of the order of 40 to 45 mm so as to provide a substantial mechanical advantage for winding a wire or cord onto the shank when a major part of the weight of a picture is supported by the wire or cord.

The wire is further bent to form an inner rectangular convolution (6) that is contained in a plane angularly offset from that of the handle to provide convergent gaps (7) (see FIGS. 3 and 4) that define additional holding means of the nature defined above. The cord can be wedged releasably into these gaps to hold it in association with the spool, for example when a picture is removed from its hanging position and tension in the cord is released.

Figure 5:
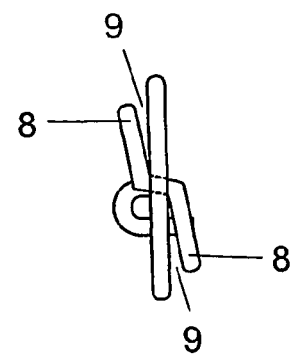
FIG. 5 is an end view similar to FIG. 3 but illustrating a variation in which a stamping operation has been performed in order to modify the additional holding means that are integral with the spool illustrated in FIGS. 1 to 4.
Figure 7:
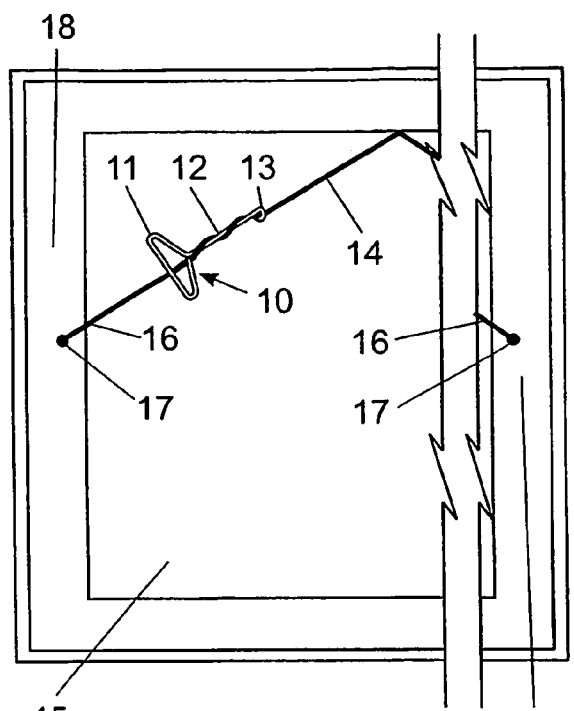
FIG. 7 is a rear view of a picture having a picture cord fitted in conventional manner and illustrating a spool according to the invention in an operative position.

As illustrated in FIG. 5, the inner rectangular convolution could be subjected to a stamping operation in order to offset two wings (8) of the handle and to form convergent gaps (9) having a smaller angle that conforms is more to a locking wedge configuration.

Figure 6:
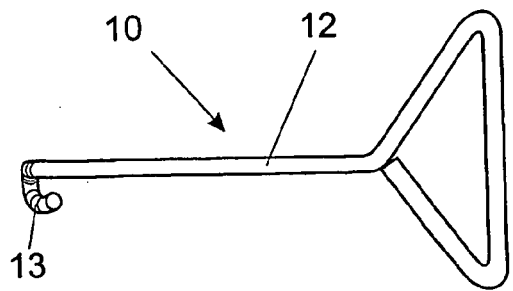
FIG. 6 is an elevation of a variation of the embodiment illustrated in FIGS. 1 to 4 simplified by the omission of any additional holding means.
Figure 3:
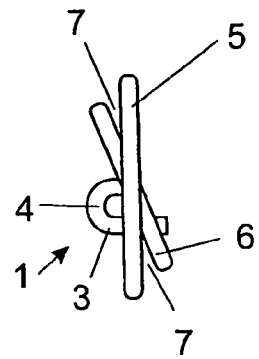
FIG. 3 is an end view from the handle end of the spool.
Figure 4:
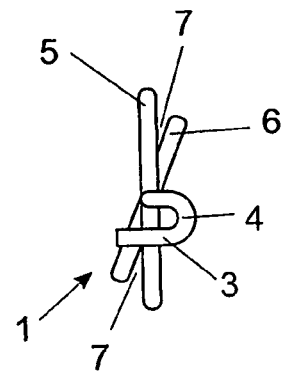
FIG. 4 is an end view from the opposite end of the spool.

FIG. 6 illustrates a simpler embodiment of the invention, generally indicated by numeral (10), that is similar to the one illustrated in FIGS. 1 to 4 but with the additional holding means (the inner convolution) totally omitted and the shape of the handle (11) accordingly varied to a roughly squat triangular configuration. The spool of this embodiment thus comprises the handle (11) at one end of a straight shank (12) and a generally radially extending U-shaped formation (13) at the opposite end, as described with reference to FIGS. 1 to 4.

Referring now to FIGS. 7 to 11 of the drawings, the spool described with reference to FIG. 6 may be used on a cord (14) that is installed in the usual way on a picture (15) by attaching the two ends (16) of the cord to fasteners (17) fixed to the picture frame (18). It will be understood that by shortening the effective length of the cord between the fasteners the height at which the picture hangs will be adjusted.

Figure 8:
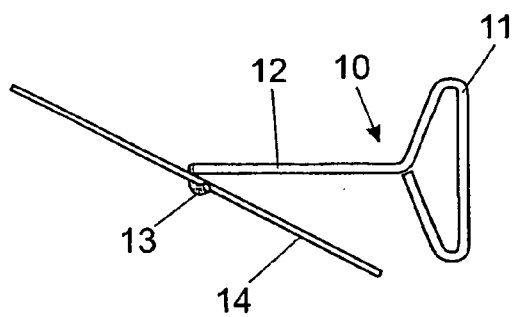
FIG. 8 is an elevation illustrating the first step in installing a spool of the type illustrated in FIG. 6 on the picture cord whilst the picture is in its operative suspended condition.

With the picture in its operative position (the spool can also be installed before the picture is hung on the wall as will become apparent from the following), the one side of the picture can simply be pulled away slightly from the wall and the spool manipulated so that the cord (14) is located in the U-shaped formation (13) with the shank (12) extending at an incline to the cord as shown in FIG. 8. Rotation of the shank using the handle (11) in the appropriate direction, in this case in clockwise direction when viewed from the handle end: of the spool, will cause the cord to become wound around the shank.

Figure 9:
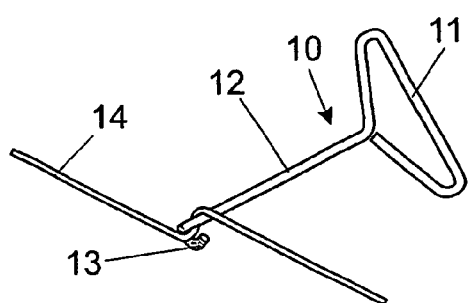
FIG. 9 illustrates the spool in a position in which a first revolution of cord has been wound onto the shank.

An initial revolution or half revolution is firstly wound on onto the shank with the shank extending at an incline to the cord as illustrated in FIG. 9.

Figure 10:
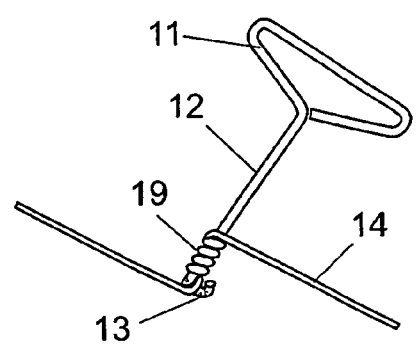
FIG. 10 is a similar illustration showing the spool shortening the cord by a considerably greater amount.
Figure 11:
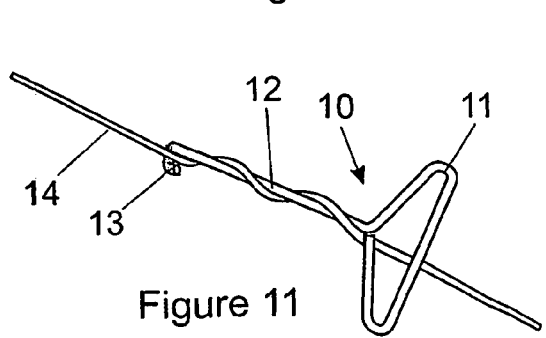
FIG. 11 is a similar illustration showing the spool in its final position in which it is locked by tension in the cord.

Depending on how much adjustment is needed, only a single revolution or even a half a revolution can be employed in which case the cord can assume an extremely long pitch helix around the shank as shown in FIG. 11. This has the effect of shortening the cord by only a very small amount that will adjust the height of the picture by an amount that will ultimately depend on the angle that the wire or cord makes with the horizontal. In a fairly conventional situation and with the dimensions of the spool described above an adjustment in height of the picture of 1 to 2 mm (0.04 to 0.08 inches) can generally easily be achieved and possibly even less depending on circumstances and design. The spiral location of the cord on the shank therefore affords a fine adjustment of the length of the cord. If a greater degree of adjustment is necessary more cord should be wound onto the shank to result in a situation that is illustrated in FIG. 10 in which a plurality of convolutions indicated by numeral (19) are wound onto the shank towards the end remote from the handle and this is achieved by saying the shank outwards to a more transverse orientation relative to the cord, as illustrated.

In any event, once adequate cord has been wound onto the shank, the handle is moved towards the adjacent portion of the cord that is allowed to engage an appropriate side of the handle as shown in FIG. 11. The tension in the cord will hold the spool in this position indefinitely whilst tension is present in the cord.

Figure 12:
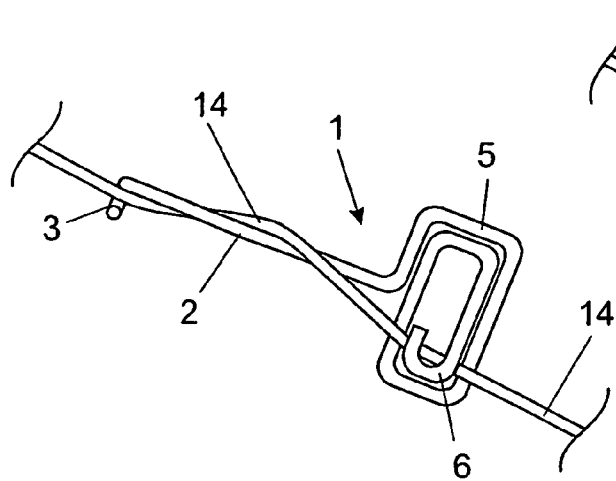
FIG. 12 is a similar illustration showing the embodiment of FIGS. 1 to 4 with the cord engaged by the additional holding means on one side of the handle.
Figure 13:
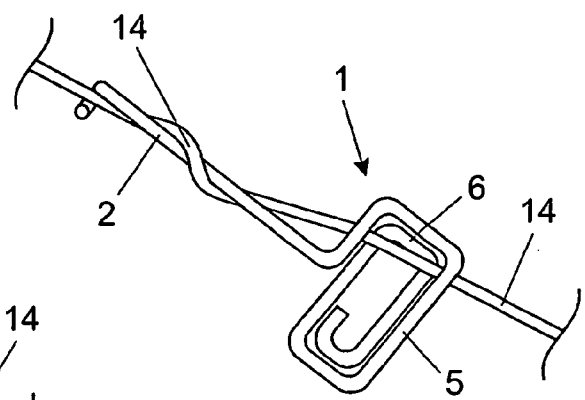
FIG. 13 is a view similar to FIG. 12 with the cord engaged by the additional holding means on the other side of the handle.

Be that as it may, in instances in which additional holding means described with reference to FIGS. 1 to 4, or 5 are present the cord (14) can be engaged in the gaps (7) on either side of the handle as illustrated in FIGS. 12 and 13.

Figure 15:
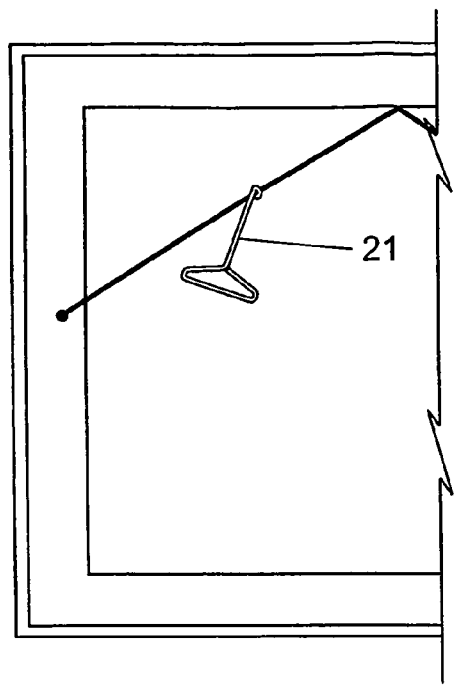
FIG. 15 is a view similar to FIG. 7 showing the embodiment of FIG. 14 held captive on the picture cord.
Figure 14:
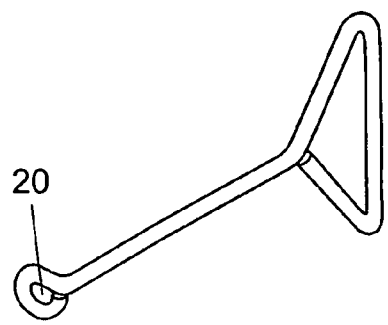
FIG. 14 is an isometric view of a variation of the embodiment of the invention illustrated in FIG. 6 there is adapted for fitment to a picture as original equipment at the time when the picture cord is initially installed thereon.

It will be understood that a reasonable amount of dexterity may be required to carry out initial installation of the spool and installation can be greatly simplified by employing the embodiment of the invention illustrated in FIG. 14. In this case the U-shaped formation is replaced by a closed eyelet (20) offset to one side of the shank and through which the cord must be threaded at the time that it is attached to the picture in the first place. Alternatively, one end of the cord must be released and threaded through the eye in order to install an embodiment of this general nature. In this case there is no difficulty in maintaining the keeper formation in association with the cord as it is held captive. Such a captive spool is indicated by numeral (21) in FIG. 15. In order to prevent the spool from sliding up and down the string the person installing it could tie a single knot around the eye with the spool located at an appropriate position such as that illustrated in FIG. 15.

Figure 16:
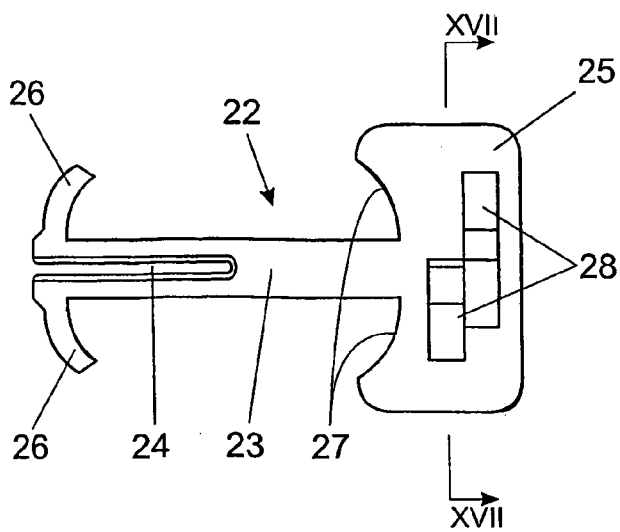
FIG. 16 is an elevation of a plastics injection moulded spool according to the invention.
Figure 17:
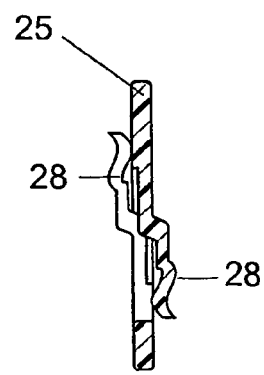
FIG. 17 is a cross-section taken along line XV to XV in FIG. 16.

Turning now to the embodiment of the invention illustrated in FIGS. 16 and 17 a spool, generally indicated by numeral (22) is made of injection moulded plastics material and has a flat configuration with a shank (23) that has a slot (24) entering from one end and an integral handle (25) at the opposite end. A laterally extending retainer formation (26) extends arcuately outwards from each side of the slotted end of the shank and the opposing edges (27) of the handle are arcuately shaped complimentarily. The arcuate shapes assist in guiding the wire or cord into engagement with the relevant component when the spool is moved to its orientation in which the shank extends in the same general direction as a cord on which it is used.

In this embodiment of the invention a pair of integral clips (28) are formed in the handle with one being accessible from each side of the handle. These clips are shaped such that a cord can be engaged underneath them to retain the cord releasably in association with the handle. The clips thus serve as the additional holding means defined above.

In use, the spool of this embodiment of the invention is associated with a wire or cord by moving the spool such that the wire or cord is received in the slot and rotation of the spool about the axis of the shank will cause the wire or cord to wind onto the shank. The spool, for the remainder, functions in very much as described above.

Figure 18:
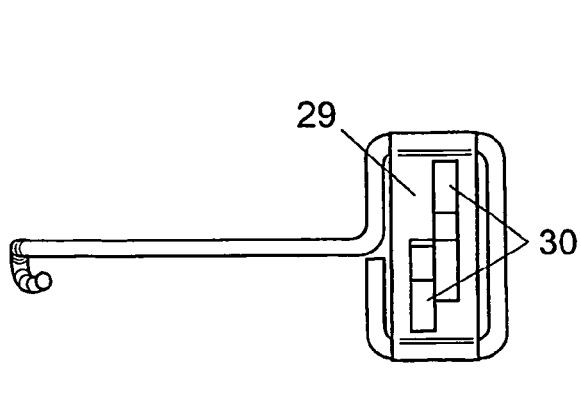
FIG. 18 is an elevation of an embodiment of the invention fitted with a separate part that defines additional holding means.

FIG. 18 illustrates an embodiment made of bent wire but having a separately made spring steel part (29) fixed to it. This part (29) may be pressed from sheet metal to form a pair of oppositely directed clips (30) substantially the same as those illustrated in FIG. 17 to serve as the additional holding means.

Figure 19:
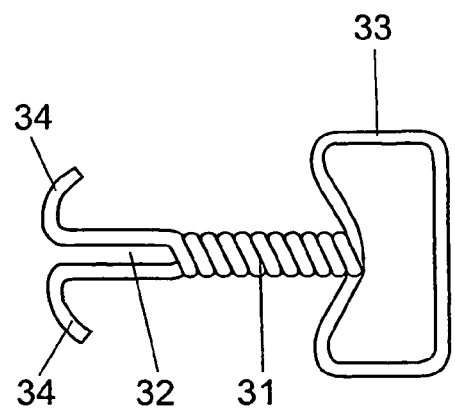
FIG. 19 is an elevation of an alternative embodiment of the invention formed of wire.

FIG. 19 illustrates an embodiment of the invention similar in outer form to that illustrated in FIG. 16 but formed of wire two passes twisted together to form the major part of the length of the shank (31) and wherein the two passes extend for a short distance in parallel spaced relationship to define a slot (32) at the end opposite the handle (33). The two free ends (34 he) of the length of wire are bent outwards to form a pair of oppositely directed retainer formations.

Figure 20:
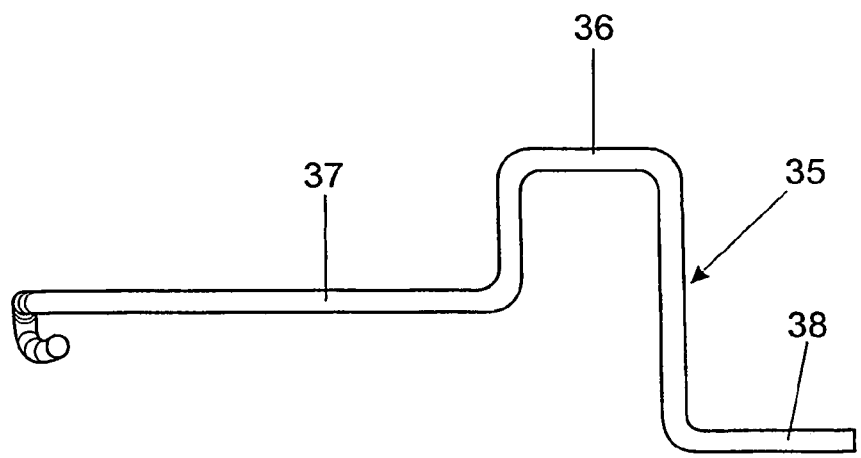
FIG. 20 is an elevation of an embodiment of the invention suitable for use in tensioning guy ropes lifting heavy objects, tensioning clotheslines or other somewhat larger scale cords.

FIG. 20 illustrates a physically much larger embodiment of the invention in which a metal rod is bent to the form a handle the form of a crank (35) having one limb (36) parallel to the shank (37) and laterally offset to one side thereof and a diametrically opposite and parallel limb (38) axially offset;on the other side of the shank. The resultant crank formation can thus be rotated by two hands of a person in a manner well known to those skilled in the art. This embodiment of the invention is aimed at shortening and therefore tightening guy ropes or other larger flexible elongate tension members or for that matter as a lifting device for lifting in the objects suspended on a cord. The diameter of such a shank could be say 6 mm (0.25 inch) and the length of the shank 150 to 300 mm (6 to 12 inches), typically about 200 mm (8 inches).

Figure 21:
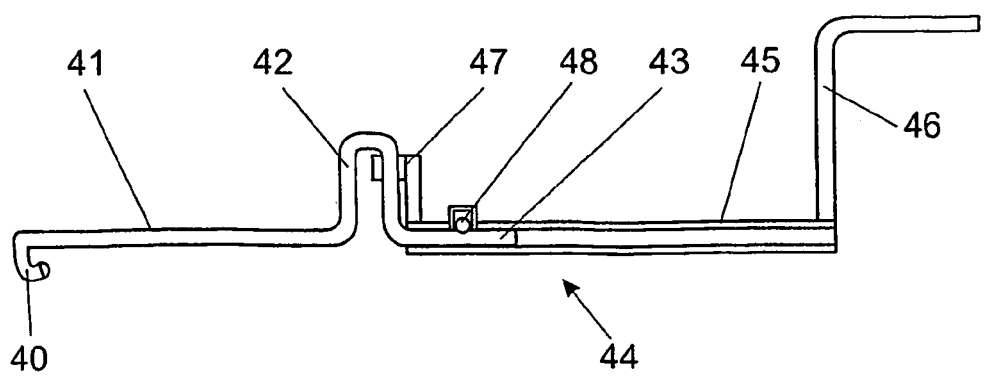
FIG. 21 is an elevation of one form of spool releasably engaged by a manually operable tool for effecting rotation thereof.

In the embodiment of the invention illustrated in FIG. 21 the free end (40) of the shank (41), being formed of metal rod, is bent to a transverse U-shaped formation defining a combination retainer formation and keeper formation.

The driven end is bent radially outwards and again radially inwards to form a radially extending narrow U-shaped retainer formation (42) with the free end of the rod terminating in an axle portion (43) that defines part of said engagement means and that is axially aligned with the shank of the spool. The retainer serves also as torque transmitting formation.

A manually operable tool, generally indicated by numeral (44), is adapted to cooperate with the spool described above by receiving the axle portion (43) in a tubular shaft (45) that has a crank (46) at its one end and, at its other end, a radially offset torque applicator (47) for cooperation with the retainer formation/torque transmitting formation (42) when the axle is received within the bore of the tubular shaft. The torque applicator can simply be a bifurcated member radially offset from the tubular shaft whereby the retainer formation can be held captive whilst the spool is rotated about its own axis with the application of a suitable amount of torque. A ball catch (48), for example, can be provided on the tool to releasably hold the tool in proper cooperative association with the spool during use.

In use, with the tool and spool attached, the spool can be rendered functional on an elongate tension member such as a guy rope, clothes line or even a strand of fence wire, simply by engaging the U-shaped formation with the elongate tension member and rotating the spool by means of the tool in the manner described above. The tension member can be wound onto the spool to any extent in order to take up any slack and apply a required tension to the member and the configuration of the crank can be chosen to provide the required mechanical advantage. Once the retainer formation (42) at the driven end of the spool has been engaged with the tension member with the spool axis extending in the same general direction as the tension member, the tool can be disengaged from the spool.

Figure 22:
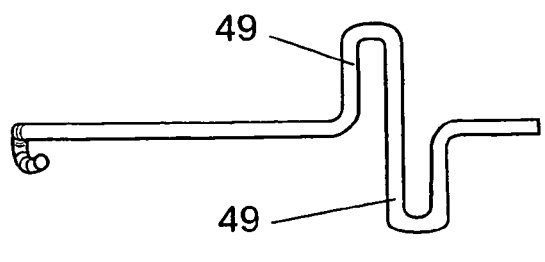
FIG. 22 is an elevation of a variation of the spool illustrated in FIG. 21 in which two alternative stop positions are provided by diametrically opposed retainer formations at the driven end of the spool.

In the event that smaller degrees of shortening required two retainer formations (49) may be provided in order that the spool can be arrested in any selected position, say 180 degrees angularly offset from the previous position, such a spool being illustrated in FIG. 22.

Figure 23:
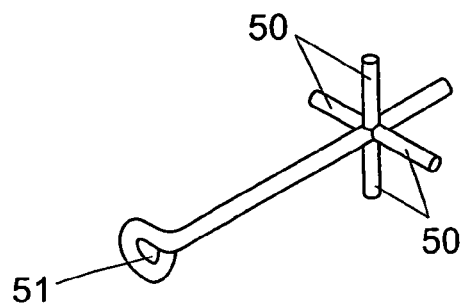
FIG. 23 is an isometric view of a still further variation of spool having four angularly offset retainer formations at the driven end of the spool.

In the event that it is desired to arrest the rotation of the spool in selected angular positions 90 degrees offset relative to each other the arrangement illustrated in FIG. 23 could be employed in which four equally angularly offset radially extending rods (50) define retainer formations at the driven end of the spool. FIG. 23 also illustrates a closed eyelet (51) as the combined retainer and keeper formation.

Figure 24:
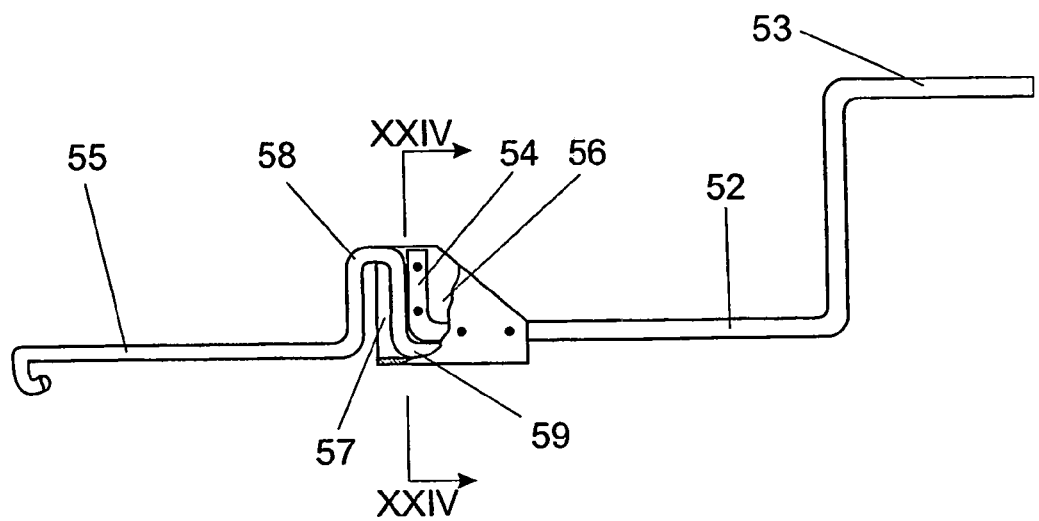
FIG. 24 is a partly broken away elevation illustrating a still further tool for cooperation with a spool; and, FIG. 25 is a cross-section taken along line XXIV to XXIV in FIG. 24.
Figure 25:
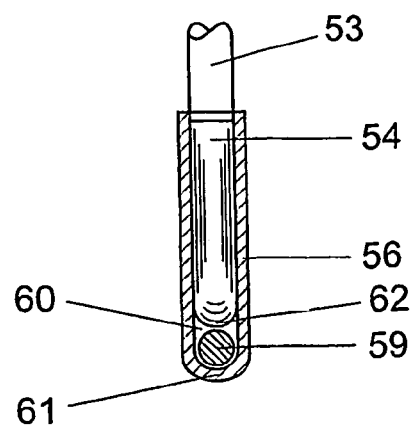

FIGS. 24 and 25 illustrate a further embodiment of crank (32) having a handle (53) and a radially extending driving section (54) at its end cooperating with the spool (55). A metal plate (36) is bent to a U-shape in cross-section as shown most clearly in FIG. 26 such that the U-shaped has an internal width the same as the diameter of the crank. The display is smart welded or otherwise secured to the driving section (54) such that a pair of spaced edges (57) received between them the radial torque transmitting part (58) of the spool and the axle part (59) is received in a space (60) left between the web (61) of the channel shaped plate and the bottom (62) of the crank. The plate operatively tends to serve to locate the axle of the spool to permit of easy introduction and also to act as the torque transmitting part of crank.

Numerous other embodiments are possible within the scope hereof without departing from the spirit of the invention which relies primarily on the fact that the spool is elongate relative to its diameter and the axis of the spool in the installed condition extends in the same general direction as the cord wound thereon whilst the configuration enables cord to be the wound onto the spool both in substantially circumferential convolutions to achieve a greater shortening effect as well as in a spiral one that allows a lesser shortening effect and thus a more accurate adjustment to be achieved, selectively by manipulation of the spool during installation.

The invention claimed is:

1. A spool for shortening the length of a cord and optionally tensioning it at the same time, the spool comprising a reel formation in the form of an elongated generally straight shank having a length of from about 10 to about 50 times the diameter of the shank and around which the cord can be wound to shorten its effective length, the shank having a transverse retainer formation at each of its ends for operatively preventing the cord that is wound onto the reel from unwinding therefrom, a keeper formation at one end of the shank for cooperation with a cord to maintain said end in association with the cord whilst the shank is rotated to wind cord onto the shank by rotation thereof and a torque transmitting formation at the other end of the shank whereby the reel can be rotated about its own axis wherein the transverse retainer formations are adapted operatively to prevent the wound cord from unraveling from the elongated shank at least whilst the cord is held under tension and the axis of the shank extends in the same general direction as that in which the cord extends.

2. A spool as claimed in claim 1 in which the transverse retainer formation at said one end of the shank forms also the keeper formation.

3. A spool as claimed in claim 1 in which the retainer formation at said other end of the shank forms also the torque transmitting formation.

4. A spool as claimed in claim 1 in which the length of the shank is from about 15 to 40 times the diameter of the shank.

5. A spool as claimed in claim 1 in which additional holding means is provided for releasably engaging a cooperant cord to prevent unravelling thereof off the shank under conditions in which tension is removed from the cord.

6. A spool as claimed in claim 1 in which the spool is formed from a suitable gauge of metal wire or rod that is bent to form a generally straight shank in the middle; a combination retainer formation and keeper formation at one end; and a combination retainer formation and torque transmitting formation at the other end.

7. A spool as claimed in claim 1 in which the torque transmitting formation is a handle formed integral with the shank.

8. A spool as claimed in claim 1 in which the torque transmitting formation is adapted for cooperation with a separate manually operable tool in the form of a crank.

9. A method of shortening a cord comprising the steps of associating the keeper formation of a spool as claimed in claim 1 with the cord; rotating the shank generally about its own axis by means of the torque transmitting formation with the shank extending transverse to the cord so as to wind cord around the shank to a required extent; and releasing the torque transmitting formation such that the shank extends in the same general direction as the cord and the transverse retainer formations at each end serve to prevent unravelling of the cord from the shank.

10. A spool as claimed in claim 2 in which the combined retainer and keeper formation is a generally U-shaped formation extending at generally right angles to the length of the shank.

11. A spool as claimed in claim 7 in which the spool has a generally axially extending axle for cooperation with a bore or socket in a cooperant part of said manually operable tool in order to align said part and the spool approximately axially during cooperant use thereof.

12. A method as claimed in claim 9 in which the spool is manipulated such that the shank extends at an incline to the cord, at least during rotation of the shank to initiate winding of the cord around the shank and, in the case that a plurality of revolutions of the shank are required to shorten the length thereof adequately, winding said plurality of revolutions on the shank towards said one end thereof having the keeper formation, this being effected by manipulating the angle at which the shank extends transverse to the general length of the cord, followed by a decrease in the angle at which the shank extends relative to the cord so that a final revolution or part revolution of the cord spirals along a substantial portion of the length of the shank.

\* \* \* \* \*